Feb. 9, 1965   R. W. BLACK   3,168,955
APPARATUS FOR LIGHTERING CARGO VESSELS
Filed July 8, 1963   6 Sheets-Sheet 1

INVENTOR.
RICHARD W. BLACK
BY
ATTORNEY

Feb. 9, 1965    R. W. BLACK    3,168,955
APPARATUS FOR LIGHTERING CARGO VESSELS
Filed July 8, 1963    6 Sheets-Sheet 2

INVENTOR.
RICHARD W. BLACK
BY Joseph A. Hill
ATTORNEY

INVENTOR.
RICHARD W. BLACK
BY Joseph A. Hill
ATTORNEY

INVENTOR.
RICHARD W. BLACK
BY
ATTORNEY

Feb. 9, 1965  R. W. BLACK  3,168,955
APPARATUS FOR LIGHTERING CARGO VESSELS
Filed July 8, 1963  6 Sheets-Sheet 5

INVENTOR.
RICHARD W. BLACK
BY Joseph A. Hill

ATTORNEY

United States Patent Office 3,168,955
Patented Feb. 9, 1965

3,168,955
APPARATUS FOR LIGHTERING CARGO VESSELS
Richard W. Black, Williamsburg, Va., assignor to the United States of America as represented by the Secretary of the Army
Filed July 8, 1963, Ser. No. 293,565
5 Claims. (Cl. 214—13)
(Granted under Title 35, U.S. Code (1952), sec. 266)

The invention described herein may be manufactured and used by or for the Government for governmental purposes without payment to me of any royalty.

This invention relates to a method and suitable apparatus for transferring cargo, and more particularly to a method and apparatus for transferring cargo from a ship's hold to amphibious lighters for movement of the cargo ashore from a ship.

It is among the objects of the invention to provide improved apparatus carried by a cargo ship for assembling or unitizing cargo removed from a ship's holds and depositing the cargo in amphibious lighters located alongside the ship and secured in fixed position relative thereto.

A still further object resides in the provision of improved, ship carried cargo handling gear including means for holding cargo receiving lighters alongside the ship in fixed position relative to the ship with no material relative movements of a lighter and the ship because of the difference in the action of waves on the ship and the lighter.

An additional object resides in the provision of improved ship carried apparatus for loading cargo lighters from the ship's holds which apparatus includes a cargo assembling or unitizing platform or table upon which small cargo items, removed from the hold by the ship's cargo hoisting gear can be assembled into lighter loads for transfer to lighters positioned alongside the ship thus providing for substantially constant operation of the ship's hoisting gear at loadings small enough to come within the safety regulations of the maritime labor unions and appropriate Government agencies.

Another object resides in the provision of improved ship carried apparatus for loading cargo lighters from a ship's holds which readily permits the simultaneous use of as many as four hoisting gear units to lift a heavy object, such as automotive vehicle, out of a hold and place it in position for transfer into an associated lighter.

Yet another object resides in the provision of improved cargo handling gear which includes means for rigidly guiding cargo units from the time the cargo has been removed from the hold of a ship until it is deposited in an associated lighter so that the cargo will not be damaged or disturbed by movements of the ship or the lighter.

A still further object resides in the provision of improved apparatus and an improved operating procedure whereby the raising of cargo from a ship's hold and the assembling of the cargo into unitized loads for deposit into a lighter secured alongside the ship can proceed prior to the arrival of a lighter in loading position to thereby provide a more continuous use of the ship's cargo hoisting gear than is possible with existing apparatus and current procedures.

Other objects and advantages will become apparent from a consideration of the following description and the appended claims in conjunction with the accompanying drawings wherein:

Figure 1:
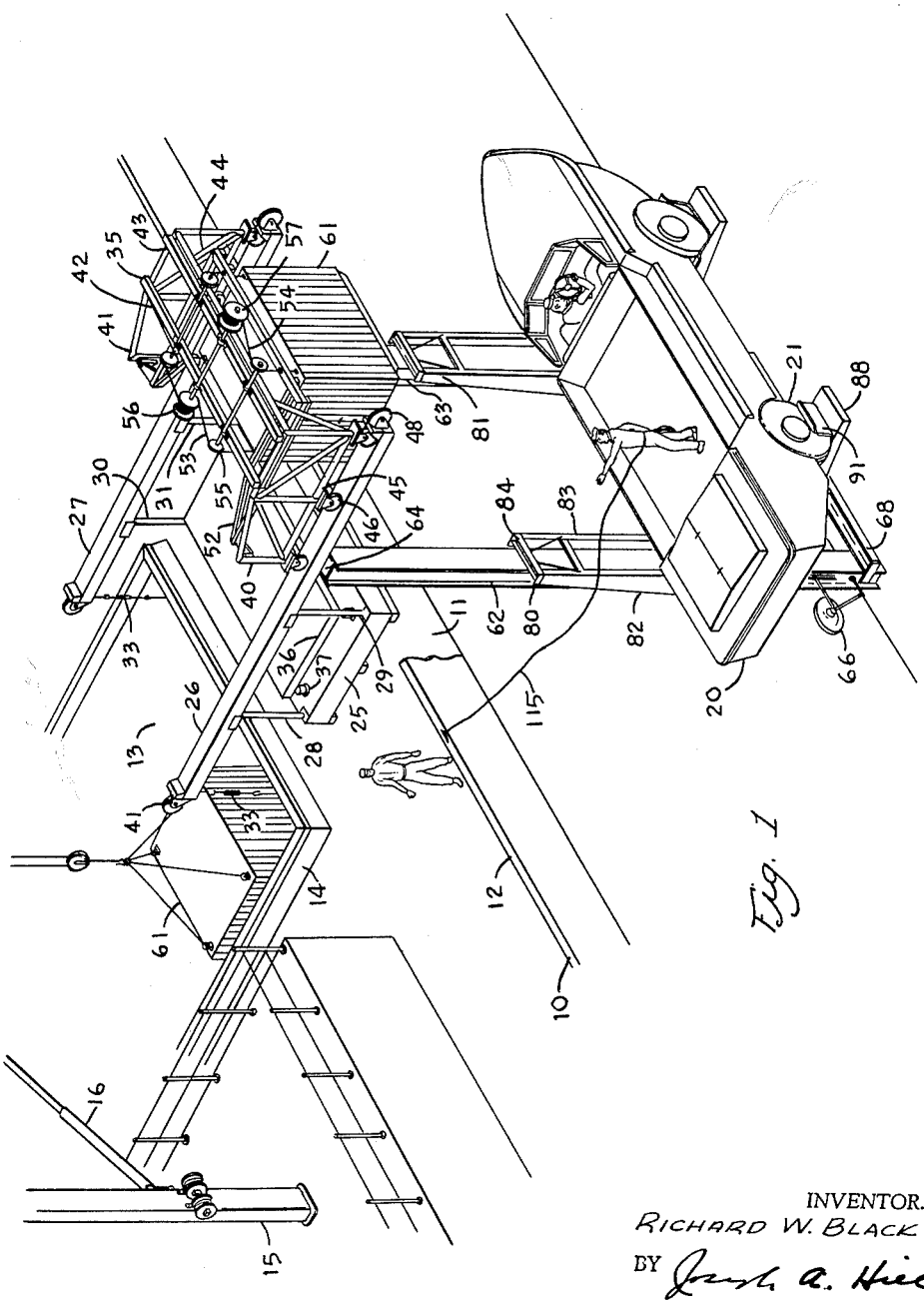
FIG. 1 is a fragmentary perspective view of a cargo ship, an amphibious lighter located alongside the ship and apparatus for holding the lighter in position relative to the ship and for moving cargo units from the ship's deck to the lighter.

With continued reference to the drawings, the numeral 10 generally indicates a cargo ship which may be of a conventional construction and which has a deck 11 extending between the opposite gunwales 12 of the ship, a hatch opening 13 in the deck providing access to one of the cargo holds of the ship, and a hatch girder and combing 14 surrounding the opening 13. The ship is also provided with cargo hoisting gear, as indicated by the mast 15 and boom 16, the boom being pivotally connected at one end to the lower portion of the mast 15. The hoisting gear is provided with the usual blocks and cables for positioning the boom relative to the mast, moving the outer or distal end of the boom, and for raising cargo items from the ship's hold through the hatch opening 13 to a position above the hatch combing 14 and across the portion of the deck between the gunwale and the hatch girder when the outer end of the boom is moved. Preferably, the ship provides four hoist units at each hatch opening so that, while each boom may be limited to a load of not more than 3,000 pounds, four booms operating together may lift a load of as much as 12,000 pounds or six tons. Hoisting gear operators prefer to use a relatively light cable because of its flexibility and handling ease and the safety regulation of maritime unions and Government agencies may limit the loading on a single boom to as little as one and a half tons.

The lighter is generally indicated at 20 and may comprise a five-ton or fifteen-ton, self-powered amphibious lighter having a propeller and rudder mechanism, not illustrated, and wheels 21 provided with pneumatic tires. Such a lighter is operative to receive a cargo fraction from the ship, to carry such cargo fraction across the intervening water to the shore or beach, move out of the water onto the shore or beach and then carry its cargo load inland to a suitable unloading location.

In certain types of military operations resupply of combat troops by over-the-beach movement of supply cargo from ship to shore is essential. This has been previously accomplished by the use of beaching craft such as the LST's and LSM's of the Second World War. This method, however, has many drawbacks since these landing crafts, while small in comparison to the size of an ocean-going cargo ship, are too large to be readily secured in fixed position relative to the ship during the movement of cargo from the ship to the landing or beaching craft. Under these conditions, the waves cause the ship and the landing craft to roll and pitch completely out of phase with each other and the landing craft to rise and fall relative to the ship. This renders the depositing of cargo from the ship into the landing craft an extremely difficult and time-consuming operation and results in much damage to and loss of valuable cargo. Once the landing craft has been loaded it can proceed only as far as the beach and must then be unloaded on to land vehicles for movement of the cargo inland. Beaches or shores are generally not suitable for the operation of land vehicles, such as trucks or tractors towing trailers, and the beach must therefore be reinforced with steel mats or other suitable material and even then the vehicles frequently become stalled and have to be unloaded before they can be freed. Since the unloading area is usually only a short distance from the beach and the cargo ship is usually a relatively short distance offshore, the use of landing craft and land vehicles for moving cargo results in extremely inefficient usage of both types of vehicles and in excessive loss of time, cargo and man power. Frequently the cargo ship is in danger from enemy aircraft and artillery fire at all times while it is immobilized close to shore and it is therefore desirable that the unloading operation be carried on at night and preferably completed in one night, if possible.

During the Second World War some small amphibious lighters were developed, such as those referred to as "DUKW" and the "WEASEL" but these did not have the capacity to handle large quantities of cargo with any degree of efficiency. Since the end of the Second World War, the amphibious lighter has been highly developed and there are now available such amphibious craft as the five- and fifteen-ton LARC and the sixty-ton BARC. These vehicles are able to receive large increments of cargo from a ship, carry the cargo ashore and inland to the cargo staging area where they may be unloaded by suitable mobile cranes, and then returned rapidly to the ship for another cargo load. The greatest difficulty encountered so far in the use of such amphibious lighters has been the difficult and time-consuming operation of moving cargo increments from the ship into the lighters and the damage to or loss of cargo because of relative movements of the ship and the associated lighter and the impossibility of operating the ship's hoisting gear with sufficient speed and accuracy for the entire lighter loading operation.

It is a principal object of the present invention, therefore, to provide a method and suitable apparatus for holding the lighter against movement relative to the ship during the lighter loading operation, for moving cargo increments from the ship's holds and assembling the increments into unitized lighter loads on the deck of the ship and then moving the unitized loads over sides and lowering them into associated lighters. This object also includes the moving of unitary loads, such as vehicles or loaded cargo containers, from the hold onto the deck and thence over the side and into a lighter. The present invention is particularly concerned with the apparatus for supporting cargo loads on the ship's deck and moving these loads over side and into a lighter held in position alongside the ship.

Suitable apparatus for the above purpose is illustrated in the accompanying drawings and comprises a rectangular base structure 25 secured to the ship's deck 11 between the gunwale 12 and the adjacent side of the hatch 14. This base is a frame structure of minimum weight consistent with the necessary strength and, while rigidly secured to the deck under operating conditions, may be shifted from hold to hold of the ship as the ship is progressively unloaded. This base may be secured in position by suitable turnbuckles, not illustrated, secured to the base and engaged in the pad eyes conventionally provided on the deck of a ship of the character indicated. A pair of rails or trackways 26 and 27 extend across respectively opposite ends of the base 25 above the base in spaced apart and parallel relationship to each other.

Figure 4:
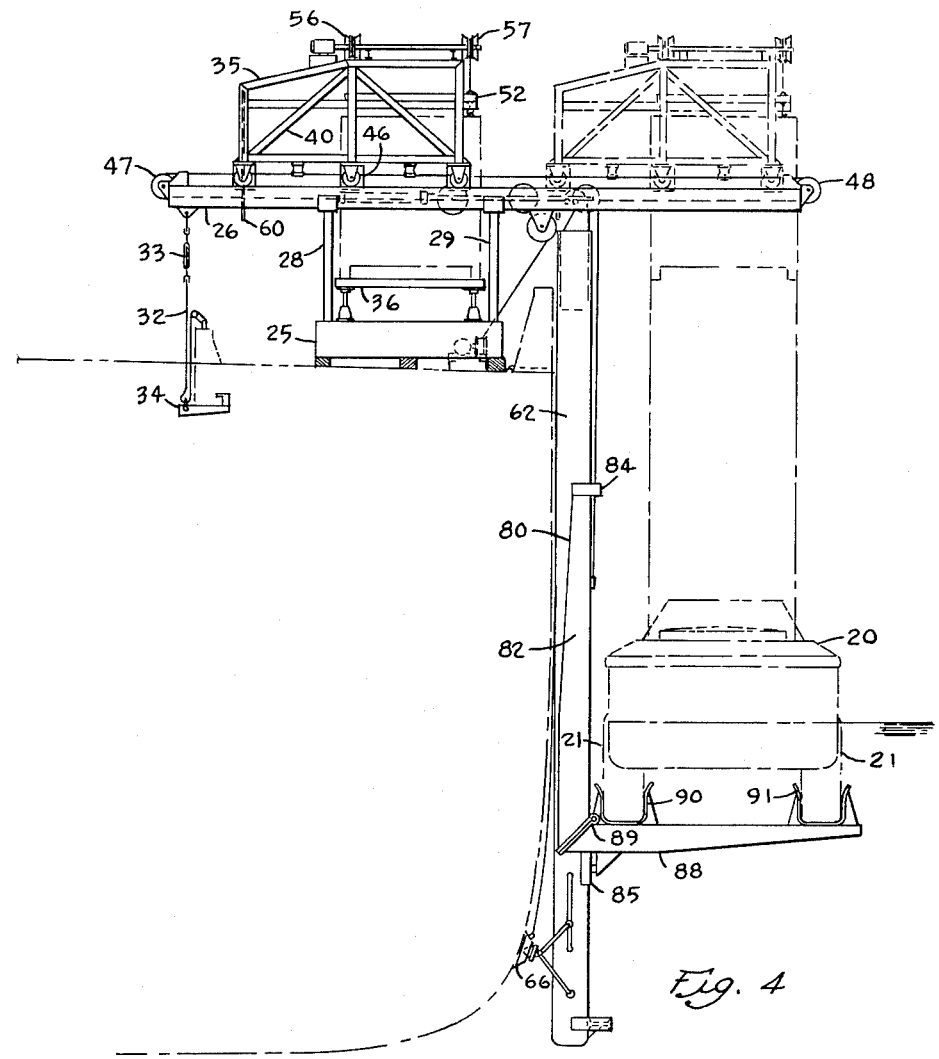
FIG. 4 is a side elevational view of the cargo handling apparatus with the amphibious lighter and a fragmentary portion of the ship shown in phantom lines.

The track rails are substantially horizontal or parallel to the deck 11 and the rail 26 is supported in elevated position above the base by suitable stanchions 28 and 29 extending upwardly from corresponding corners of the base. The rail 27 is supported by corresponding stanchions 30 and 31 extending upwardly from the opposite end of the base. These stanchions may be received in the base 25 for storage when the apparatus is not in use. The inner ends of the rails 26 and 27 extend somewhat inwardly of the adjacent side of the hatch girder 14 and these ends are secured to the hatch girder by suitable links 32, turnbuckles 33 and hooks 34 on the lower ends of the links 32 engaging under the lower flange of the associated hatch girder, as is particularly illustrated in FIG. 4. The hatch girder is a part of the main framing of the ship and these connections between the inner ends of the rails and the hatch girder prevent the rails from tilting when a load is moved from the inner to the outer ends of the rails, as will be presently described. The rails 26 and 27 are of channel or rectangular cross-sectional shape and have flat surfaces facing upwardly on which the wheels of a cargo transporting carriage, generally indicated at 35, may run.

A cargo receiving and load assembling table or platform 36 is disposed above the base 25 and supported on the base by a plurality of hydraulic jacks, as indicated at 37 so that the platform can be raised and lowered, as will presently appear. In the arrangement illustrated there are four jacks 37 disposed one at each corner of the rectangular platform 36 and these jacks operate simultaneously under the control of an operator to raise and lower the platform 36 relative to the base 25.

With the arrangements so far described and with the load receiving platform 36 in its uppermost position, the ship's hoisting gear is effective to lift cargo items out of the cargo hold through the hatch opening 13 and deposit the items on the platform 36 where they may be assembled into unitized cargo increments suitable for deposit in the lighter 20. In case the cargo consists wholly or in part of standard containers filled with cargo material, or vehicles such as can be carried by the lighter, the containers or vehicles are lifted out of the hold and set, one at a time, on the elevated platform 36 from which they are removed by the carriage 35.

A modern cargo ship usually has a hoisting gear arrangement such that four hoisting booms are usable over each hatch opening. Each boom is of limited lifting capacity, 3,000 pounds for example, but by using all four booms together a load of 12,000 pounds or six tons could be lifted from the hold. This would provide an ample factor of safety for lifting a 5-ton load for loading a 5-ton amphibious LARC.

When using four booms together, the load could not be moved over side of the ship since two of the booms would be on the wrong side of the ship and would not reach to an over side position. However, all four booms can be used to lift a cargo load from the hold and place the load on the platform 36 located near the hatch opening.

Figure 7:
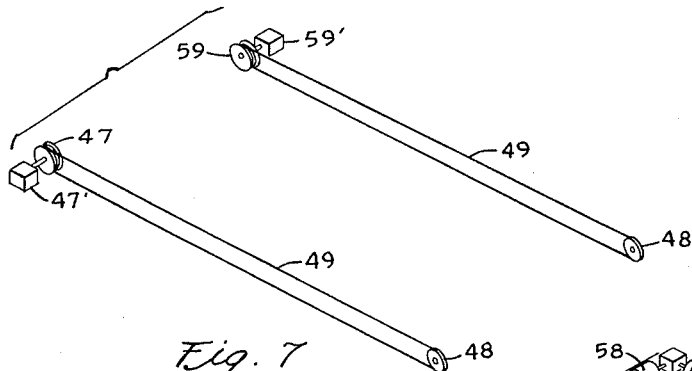
FIG. 7 is a diagrammatic perspective view of power operated cable means for moving a cargo carriage back and forth.

The carriage 35 comprises two end frames 40 and 41 held in upright and mutually parallel relationship by frame cross-members, as indicated at 42 and 43, to which the posts of the end frames are suitably braced, as indicated at 44. Each end frame includes three vertical posts disposed one at each end and one at the center of the frame. Suitable wheel receiving brackets 45 are secured to each end frame, one below each of vertical posts thereof. Wheels, as indicated at 46, are journalled, one in each of the brackets 45, so that there are three wheels supporting each end of the carriage 35. The wheels or rollers 46 at one end of the carriage roll on the track rail 26 and the corresponding wheels at the opposite end of the carriage roll on the track rail 27. A cable 49 extends along the rail 26 and is run over sheaves, as indicated at 47 and 48, disposed one at each end of this rail. A similar cable 49' and sheave arrangement is provided for the rail 27 and these cables are connected to corresponding ends of the carriage 35 so that the carriage can be run back and forth along the trackway between the inner and outer ends of the track rails 26 and 27. The cable sheaves 47 and 59 are driven by suitable reversible motors 47' and 59', as shown in FIG. 7.

Figure 2:
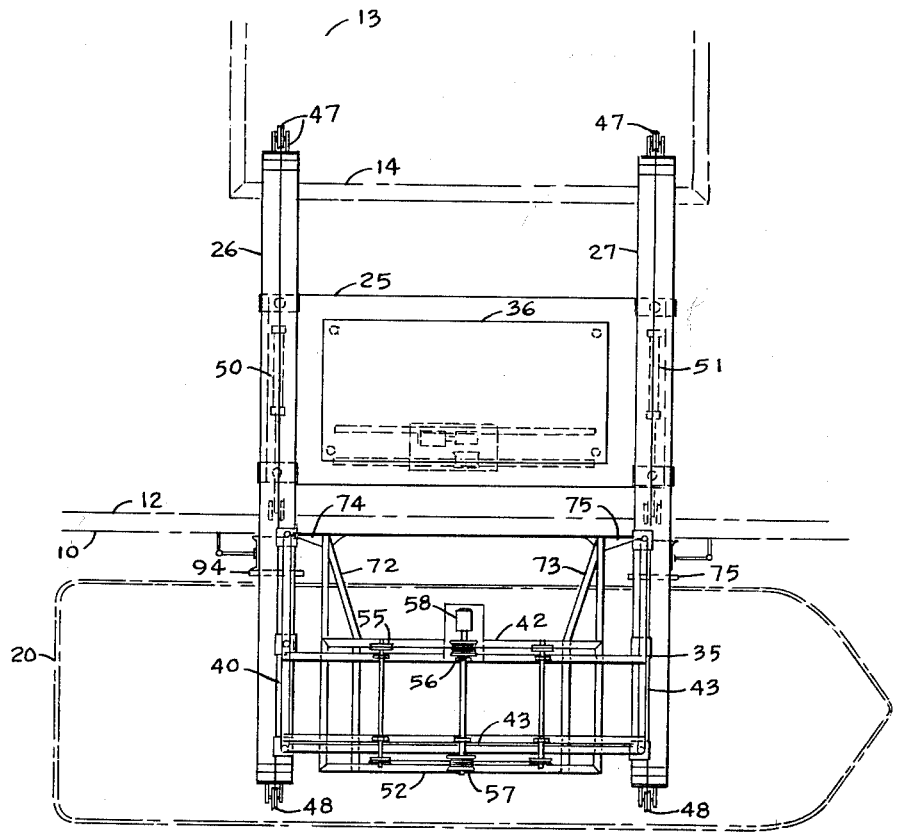
FIG. 2 is a top plan view of the cargo handling apparatus illustrated in FIG. 1, the lighter being shown in phantom lines and a fragmentary portion of the ship also being shown in phantom lines.
Figure 8:
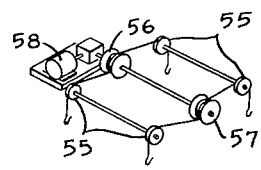
FIG. 8 is a diagrammatic perspective view of carriage supported, power operated cable means for raising and lowering the elevator carrying a cargo load.

A load carrying spreader 52, of generally rectangular shape, is disposed within the carriage 35 below the top rails or cross-members 42 and 43 of the carriage. This spreader is suspended from the carriage by cables 53 and 54 run over sheaves, as indicated at 55, and wound on the cable drums 56 and 57 which are turned by suitable power means, such as the electric motor 58, shown in FIGS. 2 and 8. With this arrangement the load carrying spreader 52 constitutes a load elevator which can be raised and lowered relative to the carriage 35 by operating the motor 58 in the appropriate direction. The drums 56 and 57 are mounted on a common shaft 56' so that the spreader will be maintained in a level condition.

With a unitized load or a container or vehicle on the platform 36 and this platform in its uppermost position, the carriage 35 with the spreader 52 in its uppermost position is run over the load and the spreader is connected to the load by suitable sling elements or cables 60 depending from the spreader.

The platform 36 is then lowered by operating the jacks 37 leaving the load suspended from the spreader 52 and carried by the carriage 35. The carriage with the suspended load, such as the "CONEX" container 61, FIG. 1, is then moved along the trackway rails 26 and 27 in a direction away from the hatch opening 13 until the carriage rests upon the outboard, cantilever portions of the rails, suitable stops 26' being provided to stop the movement of the carriage when it is in proper position to lower its suspended load into a lighter positioned alongside the ship.

Figure 3:
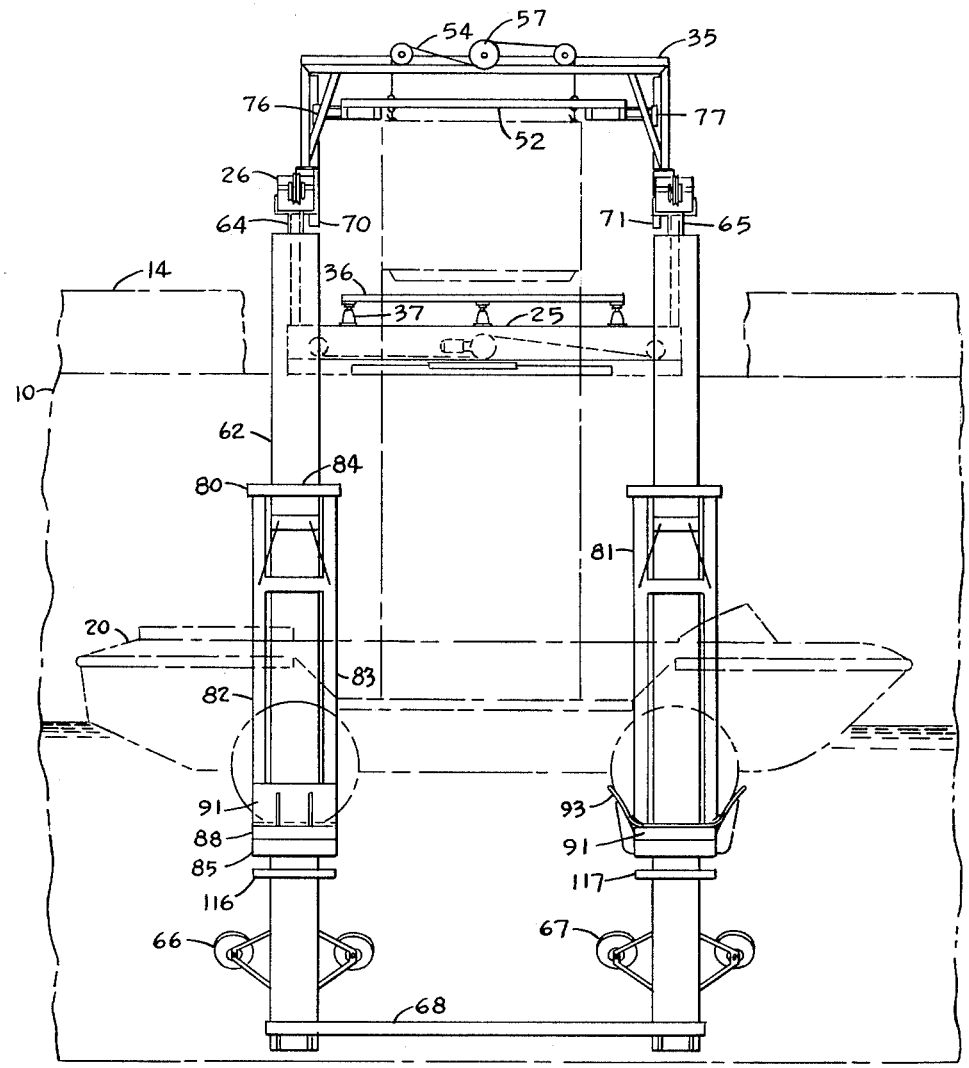
FIG. 3 is a front elevational view of the cargo handling apparatus with the amphibious lighter and a fragmentary portion of the ship shown in phantom lines.
Figure 5:
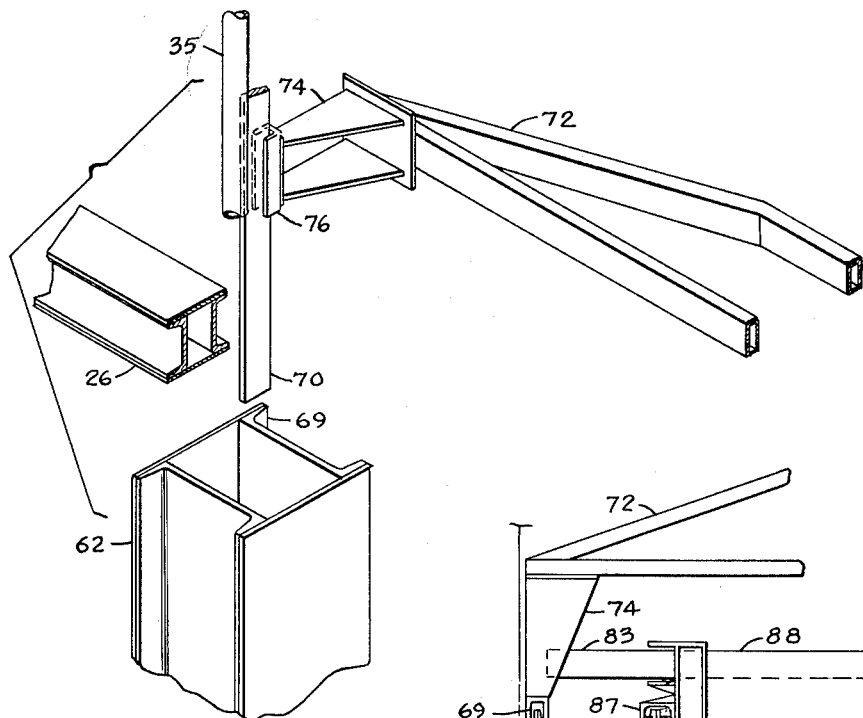
FIG. 5 is a perspective, exploded view of one corner of the cargo handling apparatus showing the manner in which the elevator portion of the apparatus is guided for vertical movement.
Figure 6:
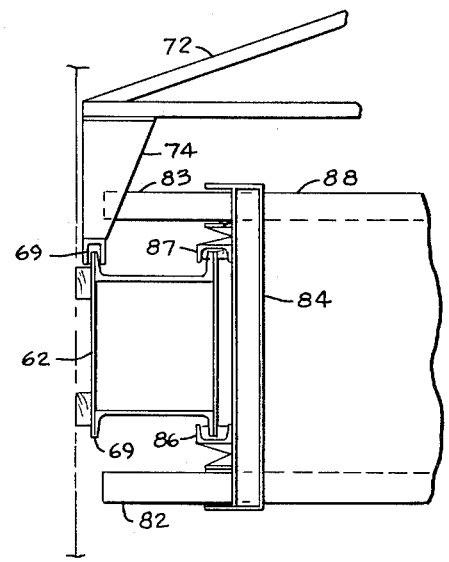
FIG. 6 is a top plan view of the corner portion of the apparatus shown in FIG. 5.

A pair of vertical guide columns 62 and 63 are disposed in spaced apart and parallel relationship along the side of the ship with the columns 62 releasably connected at its upper end to the rail 26 by a suitable pin connection 64 and the column 63 connected at its upper end to the rail 27 by a similar pin connection 65, as shown in FIG. 3. The columns 62 and 63 extend from the rails 26 and 27 downwardly into the water at the side of the ship and near their lower ends they are releasably secured to the ship by suitable means such as the electromagnetic or suction pads 66 and 67 secured to the columns and releasably engaging the side of the ship. The columns are preferably reinforced in their spaced apart and parallel relationship by suitable cross bracing, as indicated at 68. The columns 62 and 63 are of rectangular cross-sectional shape, as is particularly shown in FIGS. 5 and 6, and each column has four longitudinal flanges, as indicated at 69, projecting outwardly, one from each edge thereof.

Bars 70 and 71 project downwardly from the two corners of the carriage 35 at the side of the carriage nearest the hatch combing 14 and, when the carriage is in its limiting outboard position, as illustrated in FIG. 1, these bars are in vertical alignment with the column flanges 69 disposed inwardly of the columns 62 and 63 and adjacent the side of the ship. These bars 70 and 71 are of rectangular cross-sectional shape and of substantially the same thickness as the column flanges 69. The spreader or elevator 52 is provided at its two inner or rearward corners with outwardly projecting arms 72 and 73, as particularly shown in FIG. 2, and each of these arms carries at its outer end a bracket, as indicated at 74 and 75. Each of the brackets 74 and 75 is provided at its outer end with an elongated guide member of U-shaped cross-section, as indicated at 76 and 77 in FIG. 3. These guide members engage the bars 70 and 71 when the spreader is in its uppermost position and slide from these bars onto the corresponding column flanges 69 when the carriage is in its outermost position on rails 26 and 27 and the spreader is lowered, to guide the spreader 52 in its vertical movements up and down the columns 62 and 63. Preferably each of the U-shaped guides 76 and 77 is lined with a layer of suitable friction reducing material such as "Teflon."

With the above-described arrangement, when the carriage is in its outboard limiting position, as illustrated in FIG. 1, the load, such as the container 60 suspended from the carriage, may be lowered down the side of the ship by operating the winch drums 56 and 57 to lower the spreader 52.

An L-shaped stirrup member, generally indicated at 80 is slidably mounted on the vertical column 62 and a similar stirrup member, generally indicated at 81, is slidably mounted on the vertical column 63. As these stirrup members are substantially identical in construction, a detailed description of one only is considered sufficient for the purposes of the present description.

The stirrup member 80 has a vertical leg extending along the column 62 and comprising the vertical bars 82 and 83 disposed at opposite sides of the column 62 and interconnected at their upper ends by a cross-member 84. At their bottom ends the side bars 82 and 83 are connected by a lower cross-member 85. Channel-shaped guide members 86 and 87 extend between and are secured to the upper and lower cross-members and slidably receive the outer flanges 69 of the corresponding vertical column 62. The guide members 86 and 87 are preferably lined with friction reducing shoes 86' and 87' respectively of a suitable material, such as "Teflon," so that the stirrup members will slide easily up and down the corresponding columns 62 and 63.

The stirrup member 80 also has an outwardly projecting, horizontal leg 88 having a length somewhat greater than the tread width of the wheels 21 of the lighter 20. At its inner end the leg 88 is secured to the vertical leg by a knee joint 89 so arranged that the horizontal leg will be rigidly supported in its horizontal position but can be folded upwardly against the corresponding portion 89 to reduce the width of the stirrup assembly for convenient storage on an associated ship or transportation on a railway car. The horizontal leg 88 carries on its upper surface the wheel sockets 90 and 91 for receiving the wheels of the lighter and retaining the lighter in position on the stirrup member. In addition to the wheel sockets the horizontal leg 92 of the stirrup member 81 is also provided with hinged chocks, as indicated at 93, to hold the lighter against longitudinal movement relative to the stirrup members.

Figure 9:
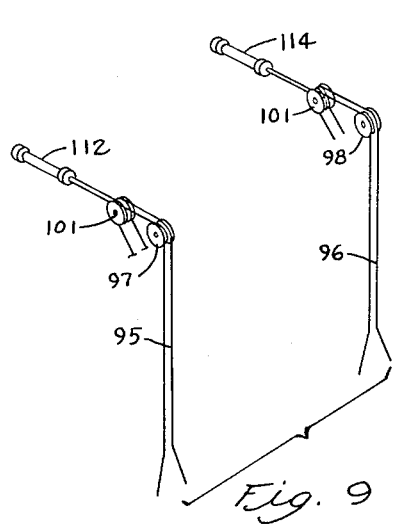
FIG. 9 is a diagrammatic perspective view of power operated cable means for holding a lighter in fixed position relative to an associated cargo ship.
Figure 10:
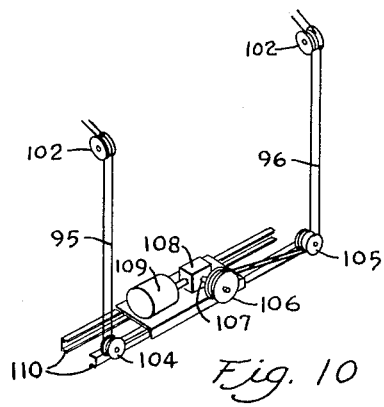
FIG. 10 is a diagrammatic perspective view of a portion of the power operated cable means shown in FIG. 9.

Suitable cables, 95 and 96, in doubled condition, extend upwardly from the vertical legs of the stirrup members 80 and 81 respectively and over sheaves 97 and 98, FIG. 9, supported by the track member 26 and 27. From the sheaves 97 and 98 the cables are run over sheaves 100 and 101, also supported by the trackway members 26 and 27 in a manner to be presently described, and from sheaves 100 and 101 over sheaves 102 and 103, FIG. 10. From sheaves 102 and 103 the cables 95 and 96 are run over sheaves 104 and 105 secured to the ship's deck within the area of the hollow base structure 25. From the sheaves 104 and 105 cables 95 and 96 extend to and are wound upon a cable drum 106. This cable drum is mounted on a shaft 107 projecting from a transmission mechanism 108. A driving motor 109 is also carried by the transmission and this assembly, including the drum 106, the motor 109 and the transmission 108, is mounted on a guide structure 110 extending between the sheaves 104 and 105. This freedom of movement of the drum 106 toward or away from either of the sheaves 104 and 105 serves to maintain equal tension in the two cables 95 and 96, and restore to a balanced condition any unbalance between the two stirrups 80 and 81. The drum 106 is effective to pay out or reel in the cables to place the stirrups at the right elevation for the load condition of the ship.

The cables 95 and 96 are doubled around the sheaves 100 and 101 and these sheaves are supported by the corresponding track rails 26 and 27 for limited freedom of movement longitudinally of the track rails. Hydraulic cylinder and piston devices 112 and 114 are connected between the track members 26 and 27 and the corresponding sheaves 100 and 101 and are effective to move the sheaves longitudinally of the track rails.

A source of fluid under pressure, such as the ship's fire fighting system, is connected to the hydraulic cylinders at the ends of the cylinders nearest the corresponding gunwale, whereby the hydraulic devices exert a force which tends to take up on the cables 95 and 96 and raise the stirrups 80 and 81 each time a lighter positioned on or above the horizontal arms of the stirrups is raised by wave action. The drum 106 can be locked against rotation in any position of rotational adjustment and the inlet valves for the hydraulic cylinders are one-way valves so that while water from the fire fighting system can enter the cylinders to take up on the cables and raise the stirrups, this water cannot escape, until manually released, and the stirrups are therefore held in the position to which they are raised. It will be noted that the hydraulic devices do not lift the weight of the lighter, the lighter being raised by wave action, the hydraulic devices merely causing the stirrups to follow up the upward movements of the lighter and support the lighter in raised position.

By means of the cables 95 and 96 and the cable drum 106 the stirrup members 80 and 81 can be raised and lowered over an extended range of movement to adjust the position of the stirrup members to the condition of buoyance of the associated ship and also for variations in the draft of different ships on which such devices may be used. The hydraulic devices 112 and 114 are used to raise the stirrups through relatively short distances to follow up a lighter or barge raised by wave effect after the stirrup members have been raised initially into engagement with the lighter or barge.

In securing a lighter in position relative to the ship, the lighter is first brought alongside the ship under its own power and a hand line 115 is passed from an operator on the lighter to an operator on the deck of the ship, as shown in FIG. 1. By use of the water propulsion apparatus of the lighter and the hand line the lighter is then brought into position so that its wheels are over the wheel sockets carried by the horizontal stirrup arms 88 and 92. The stirrup members are then raised by the hydraulic device and the corresponding cables until the horizontal stirrup arms engage under the wheels of the amphibious lighter. The stirrups are then raised as the lighter is raised by wave action until the lighter is supported in a position at which the waves do not cause it to move up or down substantially relative to the ship. When the lighter is so positioned its cargo receiving compartment is directly under the outboard portions of the track rails 26 and 27 and below a load unit, such as the container 61, supported between the tracks by the carriage 35. With the load and the lighter in the positions relative to each other and the ship, as shown in FIG. 1, the load can be lowered directly into the lighter and will not be permitted to swing or impact against the side of the ship or against the lighter during the lowering operation. Also the load will descend solidly into the lighter since the lighter will not be moving up and down relative to the load. If a 5-ton lighter is being used one 10,000-pound container or two 5,000-pound containers will constitute a full load for the lighter. In the case of larger lighters suitable mechanism and sufficient operators will be provided to position the load units in the cargo compartments of the lighters as the units are lowered into the lighters from the ship.

After the lighter has been loaded, the stirrup members 80 and 81 are lowered by manually releasing hydraulic fluid from the devices 112 and 114, and freeing the drum 106 if necessary, at which time it may pull away from the ship and be succeeded by a similar lighter in empty condition. Suitable stops 116 and 117 are provided on the lower portions of the columns 62 and 63 respectively to limit a downward movement of the stirrup members.

The unloading apparatus described above can be used to unload a ship at a dock as well as at sea since the track members 26 and 27 are located at a sufficient elevation to permit a truck, a railway flat car or gondola or an amphibious lighter, to move under the outboard ends of these members to receive loads lowered from the carriage 35 while the ship is tied up to a suitable dock. The columns 62 and 63 together with the stirrup members 80 and 81 will be removed from their operative position against the side of the ship and stored on the deck before the ship is docked. This can be done with the ship's cargo hoisting gear, and with the columns and stirrups removed, the ship can be easily docked since the track rails are high enough not to interfere with docking the ship.

While a particular embodiment of the invention has been hereinabove described and illustrated in the accompanying drawings, it is to be understood that the invention is not limited to the particular embodiment so illustrated and described but that the scope of the invention is commensurate with the scope of the appended claims.

I claim:

1. In combination with a cargo ship and an amphibious lighter, apparatus for transferring cargo from the ship's deck alongside a cargo hatch to a lighter alongside the ship comprising a pair of track rails extending across the deck of the ship from the hatch opening of the hold to a position beyond the adjacent gunwale of the ship, means supporting said rails from the ship's deck, columns extending down the corresponding side of the ship from said rails in spaced apart and parallel relationship to each other, stirrup means carried by said columns and vertically movable relative to the ship for engaging a lighter and holding the lighter in fixed position relative to the ship, said stirrup means being effective to release a loaded lighter for movement away from the ship, a carriage movable along said track rails from a position adjacent to the hatch opening to a position above a lighter held by said stirrup means, a cargo carrying spreader suspended from said carriage, power operated means for moving said carriage along said track rails, and power operated means for raising and lowering said spreader relative to said carriage whereby said spreader is enabled to pick up a cargo load from the deck, move the cargo load along said track rails and lower the cargo load into the associated lighter.

2. In combination with a cargo ship and an amphibious lighter, apparatus for transferring cargo from the deck of the ship to the lighter comprising track rails extending across the deck of the ship from the hatch opening to a position beyond the adjacent gunwale of the ship, means supporting said rails from the ship's deck, columns extending down the corresponding side of the ship from said rails in spaced apart and parallel relationship to each other, stirrup means carried by said columns and vertically movable relative thereto for engaging the lighter and holding the lighter in fixed position relative to the ship, a vertically adjustable cargo assembly platform mounted on the deck below said track rails for receiving cargo raised from the hold by the ship's cargo hoisting gear, a carriage movable along said track rails from a position above said platform to a position above the lighter, a cargo carrying spreader suspended from said carriage, power operated means moving said carriage along said track rails, and power operated means for raising and lowering said spreader relative to said carriage whereby said spreader is enabled to pick up a cargo load from said platform, move the cargo load along said rails and lower the cargo load into the associated lighter.

3. In combination with a cargo ship and an amphibious lighter, apparatus for transferring cargo from the ship's deck to the lighter comprising a pair of track rails extending across the deck of the ship from the hatch opening of the hold to a position beyond the adjacent gunwale of the ship, means supporting said rails from the ship's deck, columns extending down the corresponding side of the ship from said rails in spaced apart and parallel relationship to each other, stirrup means carried by said columns and vertically movable relative thereto for engaging the lighter and holding the lighter in fixed position relative to the ship, a carriage movable along said track rails from a position adjacent to the hatch opening to a position above the lighter, a cargo carrying spreader suspended from said carriage, power operated means for moving said carriage along said track rails, and power operated means for raising and lowering said spreader relative to said carriage whereby said spreader is enabled to pick up a cargo load from the deck, move the cargo load along said trackway and lower the cargo load into the associated lighter, said columns having longitudinally extending flanges thereon, and guide means on said spreader engageable with such flanges to hold said spreader in a path parallel to said columns as said spreader is lowered and raised between said track rails and the associated lighter regardless of rolling movements of the ship.

4. In combination with a cargo ship and an amphibious lighter, apparatus for transferring cargo from a hold of the ship to the lighter comprising a pair of track rails extending across the deck of the ship from the hatch opening of the ship to a position beyond the adjacent gunwale of the ship, columns extending down the corresponding side of the ship from said track rails in spaced apart and parallel relationship to each other, stirrup means carried by said columns engaging the lighter, elevator means connected to said stirrup means adapted to selectively raise and lower said stirrup means into and out of engagement with said lighter, selectively engageable automatic take-up means connected to said stirrup means adapted to raise said stirrup means in response to lifting of said lighter by wave movements and to hold the lighter at the highest point to which it is so lifted, a carriage movable along said track rails from a position adjacent the hatch opening of the ship to a position above said lighter, means for moving said carriage along said track rails, and power operated means suspended from said carriage for connection to a cargo load whereby the load may be raised from the ship's deck, moved along said track rails and lowered into said lighter.

5. The combination described in claim 4 wherein the elevator means includes a drum, means connected to said drum for selectively rotating the drum and a pair of cables each being attached to one of said stirrup means and wound upon said drum; and, wherein the automatic take-up means includes a pair of translatable sheaves disposed so that one cable passes over each of said sheaves, an hydraulic motor connected to each said sheave, a source of fluid under pressure, and a unidirectional inlet valve for admitting pressure fluid to each hydraulic motor when the lighter is raised by wave movements.

References Cited by the Examiner
UNITED STATES PATENTS

| | | | |
|---|---|---|---|
| 1,808,873 | 6/31 | Weeks | 214—152 |
| 2,281,471 | 4/42 | Baum et al. | 214—13 |
| 2,503,210 | 4/50 | O'Halloran | 214—152 |
| 2,761,571 | 9/56 | Adams | 214—15 |
| 2,967,631 | 1/61 | Storma et al. | 214—13 |

HUGO O. SCHULZ, *Primary Examiner.*
GERALD M. FORLENZA, *Examiner.*